US012050324B1

United States Patent
Kalinowski (10) Patent No.: US 12,050,324 B1
(45) Date of Patent: Jul. 30, 2024

(54) HEAD-MOUNTED DEVICES WITH NOSE BRIDGE DISPLAYS

(71) Applicant: Apple Inc., Cupertino, CA (US)

(72) Inventor: David A. Kalinowski, Davis, CA (US)

(73) Assignee: Apple Inc., Cupertino, CA (US)

( * ) Notice: Subject to any disclaimer, the term of this patent is extended or adjusted under 35 U.S.C. 154(b) by 319 days.

(21) Appl. No.: 17/307,891

(22) Filed: May 4, 2021

Related U.S. Application Data (60) Provisional application No. 63/042,863, filed on Jun. 23, 2020.

(51) Int. Cl.
*G02B 27/01* (2006.01)

(52) U.S. Cl.
CPC ..... *G02B 27/0176* (2013.01); *G02B 27/0172* (2013.01); *G02B 2027/0154* (2013.01); *G02B 2027/0161* (2013.01); *G02B 2027/0178* (2013.01)

(58) Field of Classification Search
None
See application file for complete search history.

(56) References Cited

U.S. PATENT DOCUMENTS

| | | | |
|---|---|---|---|
| 6,882,479 B2 | 4/2005 | Song et al. | |
| 9,494,799 B2 | 11/2016 | Robbins et al. | |
| 10,267,970 B2 | 4/2019 | Jones, Jr. et al. | |
| 10,534,174 B2 | 1/2020 | Bouchier et al. | |
| 2010/0277803 A1* | 11/2010 | Pockett | G03B 21/62 353/121 |
| 2016/0231570 A1* | 8/2016 | Levola | G02B 6/0035 |
| 2017/0123208 A1* | 5/2017 | Vallius | G02B 27/0172 |
| 2018/0046859 A1* | 2/2018 | Jarvenpaa | H04N 23/56 |
| 2018/0231784 A1* | 8/2018 | Koudsi | G02B 30/35 |
| 2018/0284440 A1 | 10/2018 | Popovich et al. | |
| 2019/0056591 A1* | 2/2019 | Tervo | G02B 6/0016 |
| 2019/0101977 A1* | 4/2019 | Armstrong-Muntner | G06N 20/00 |
| 2019/0285939 A1 | 9/2019 | Lee et al. | |
| 2022/0179213 A1* | 6/2022 | Zhou | H02J 50/80 |

* cited by examiner

*Primary Examiner* — Shan Liu
(74) *Attorney, Agent, or Firm* — Treyz Law Group, P.C.; Tianyi He

(57) ABSTRACT

A head-mounted device may have a head-mounted support structure with left and right portions that are coupled at a nose bridge portion. The left and right portions may support respective clear transparent members that form left and right lenses. During operation of the head-mounted device, a user with eyes located in left and right eye boxes may view real-world objects through the left and right lenses. A left display system may have a left display device that faces inwardly and a right display device that faces inwardly. Input couplers, waveguides, and output couplers may be used to supply left and right images from the left and right display systems to the left and right eye boxes. The left display device and right display device may be mounted in the nose bridge portion of the head-mounted support structure.

20 Claims, 6 Drawing Sheets

HEAD-MOUNTED DEVICES WITH NOSE BRIDGE DISPLAYS

This application claims the benefit of provisional patent application No. 63/042,863, filed Jun. 23, 2020, which is hereby incorporated by reference herein in its entirety.

FIELD

This relates generally to electronic devices, and, more particularly, to electronic devices such as head-mounted devices.

BACKGROUND

Electronic devices such as head-mounted devices may have displays for displaying images. The displays may be housed in a head-mounted support structure.

SUMMARY

A head-mounted device may have a head-mounted support structure such as a glasses frame coupled to left and right temples by left and right hinges. The frame may have left and right portions that are coupled at a nose bridge portion. The left and right portions may support respective clear transparent members that form left and right lenses. During operation of the head-mounted device, a user with eyes located in left and right eye boxes may view real-world objects through the left and right lenses.

A left display system may have a left display device that faces inwardly and a right display system may have a right display device that faces inwardly. These display systems may provide computer-generated content to the left and right eye boxes.

The display systems may have input couplers, waveguides, and output couplers that are used to supply left and right images from the left and right display devices to the left and right eye boxes. The left display device and right display device may be mounted in alignment with each other in an inwardly facing orientation within the nose bridge portion of the head-mounted support structure. This configuration may help maintain alignment of the left and right images at the left and right eye boxes even if the left and right portions of the head-mounted support structure bend about the nose bridge portion.

DETAILED DESCRIPTION

Head-mounted devices include head-mounted support structures that allow the devices to be worn on the heads of users. Head-mounted devices may include input-output devices for gathering input and supplying a user with output. For example, head-mounted devices may include speakers for presenting a user with audio output and/or may include displays for presenting a user with visual content.

Figure 1:
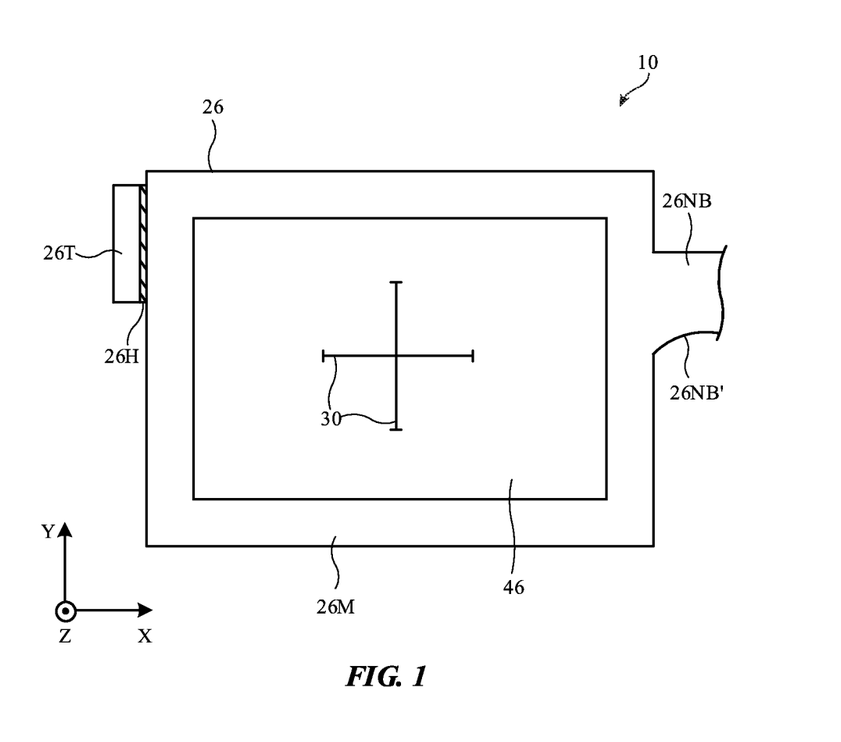
FIG. 1 is a front view of an illustrative electronic device such as a head-mounted device in accordance with an embodiment.

FIG. 1 is a front view of a portion of an illustrative head-mounted device. In the example of FIG. 1, the structures of device 10 have been configured to form a pair of glasses. If desired, device 10 may have portions forming straps, googles, structures for hats or helmets, and/or other head-mounted housings.

As shown in FIG. 1, electronic device 10 may include head-mounted support structure 26 to house the components of device 10 and to support device 10 on a user's head. Support structure 26 may include, for example, portion 26M (sometimes referred to as a glasses frame, main support member, main housing portion, or main portion) that rests in front of a user's face during use. Portion 26M may include a nose bridge portion such as portion 26NB that connects left and right sides of portion 26M and has a surface such as curved nose-shaped surface 26NB' that supports portion 26M on the user's nose. Left and right lenses such as illustrative lens 46 may be supported by portion 26M in front of the user's left and right eyes, respectively (e.g., an eye located in eye box 30). Support structure portions such as portion 26T may extend along the sides of a user's head (e.g., into the page in the orientation of FIG. 1). Portions of structure 26 such as portion 26T of FIG. 1, which may sometimes be referred to as glasses temples or elongated side support members, may be coupled to portion 26M by hinges 26H (as an example).

During operation of device 10, images may be presented to a user's eyes in eye boxes such as eye box 30. For example, each side of device 10 may have a display system that includes a display projector or other display device (e.g., a scanning mirror display or other display device) that creates a computer-generated image. Using an input coupler (e.g., a prism or holographic input coupler), this image (e.g., the image projected from the display projector or other display device) may be coupled into a waveguide that extends across an associated lens 46 in front of an associated eye box 30. The image from the display may travel through the waveguide in accordance with the principal of total internal reflection. The display system may include an output coupler (e.g. a holographic output coupler or other suitable output coupler at the end of the waveguide) that overlaps the portion of lens 46 in front of eye box 30 and directs the image out of the waveguide towards the user's eye in eye box 30.

Eye boxes 30 include a left eye box that receives a left image and a right eye box that receives a right image. FIG. 1 shows only a single lens overlapping a single eye box 30. Device 10 preferably includes a left display system that presents the left image to the left eye box and a right display system that presents the right image to the right eye box.

In addition to serving as a waveguide or supporting substrate for a waveguide to help route image light to eye boxes 30, lenses 46 and the waveguides and output couplers overlapping lenses 46 may form optical combiner assemblies. Lenses 46 and the overlapping waveguides and output couplers in device 10 may, for example, be formed from clear material such as transparent polymer or glass that allows the user to view real-world objects through lenses 46. In this way, the optical system formed by the waveguide, output coupler, and lens 46 overlapping each eye box can be used to combine display images (e.g., computer-generated content from display devices, which may sometimes be referred to as virtual image content, virtual images, or computer-generated images) with real-world image light (e.g., light from real-world objects, sometimes referred to as real-world images).

Figure 2:
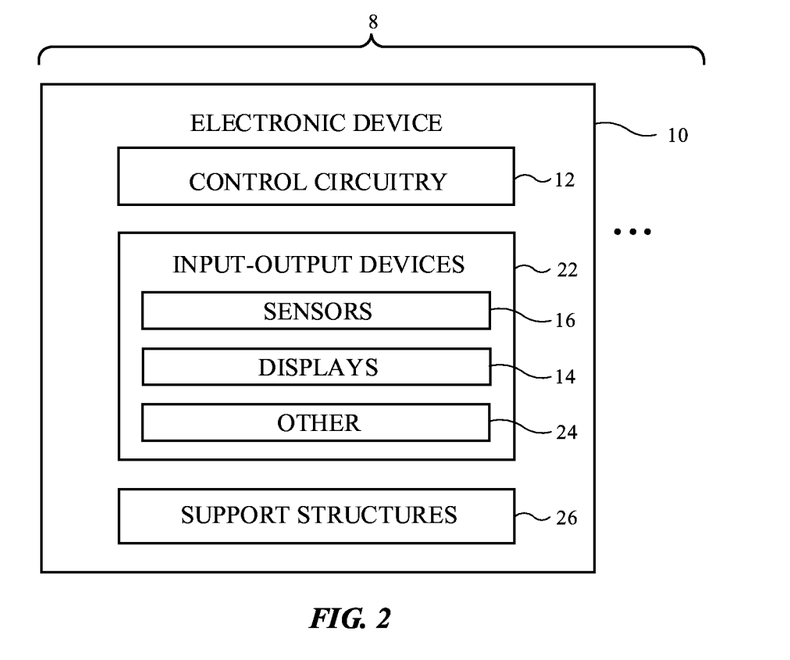
FIG. 2 is a schematic diagram of an illustrative electronic device in accordance with an embodiment.

A schematic diagram of an illustrative system that may include a head-mounted device such as device 10 of FIG. 1 is shown in FIG. 2. As shown in FIG. 2, system 8 may include one or more electronic devices such as electronic device 10. The electronic devices of system 8 may include computers, cellular telephones, head-mounted devices, wristwatch devices, and other electronic devices. Configurations in which electronic device 10 is a head-mounted device are sometimes described herein as an example. Head-mounted devices may include goggles, helmets, glasses, and/or other equipment that may be worn over a user's eyes.

As shown in FIG. 2, electronic devices such as electronic device 10 may have control circuitry 12. Control circuitry 12 may include storage and processing circuitry for controlling the operation of device 10. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involving the adjustment of the components of device 10 using control signals, etc.). Control circuitry 12 may include wired and wireless communications circuitry. For example, control circuitry 12 may include radio-frequency transceiver circuitry such as cellular telephone transceiver circuitry, wireless local area network transceiver circuitry (e.g., WiFi® circuitry), millimeter wave transceiver circuitry, and/or other wireless communications circuitry.

During operation, the communications circuitry of the devices in system 8 (e.g., the communications circuitry of control circuitry 12 of device 10), may be used to support communication between the electronic devices. For example, one electronic device may transmit video data, audio data, and/or other data to another electronic device in system 8. Electronic devices in system 8 may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

Device 10 may include input-output devices 22. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

As shown in FIG. 2, input-output devices 22 may include one or more displays such as displays 14. In some configurations, device 10 includes left and right display systems each of which has a respective display 14. Device 10 may, for example, include left and right components such as left and right scanning mirror display devices or other image projectors, liquid-crystal-on-silicon display devices, digital mirror devices, or other reflective display devices, left and right display panels based on light-emitting diode pixel arrays (e.g., organic light-emitting display panels or display devices based on pixel arrays formed from crystalline semiconductor light-emitting diode dies), liquid crystal display panels, and/or or other left and right display devices that provide images to left and right eye boxes for viewing by the user's left and right eyes, respectively.

Displays 14 may be used to display visual content for a user of device 10. The content that is presented on displays 14 may include virtual objects and other content that is provided to displays 14 by control circuitry 12 using optical combiner assemblies in device 10 that overlap eye boxes 30. The optical combiner assemblies may also allow the user to view real-world content through lenses 46.

Input-output circuitry 22 may include sensors 16. For example, sensors 16 may include gaze tracking sensors (e.g., a gaze tracking system based on an image sensor and, if desired, a light source that emits one or more beams of light that are tracked using the image sensor after reflecting from a user's eyes, etc.). Sensors 16 may also include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), touch sensors, capacitive proximity sensors, light-based (optical) proximity sensors, other proximity sensors, force sensors, sensors such as contact sensors based on switches, gas sensors, pressure sensors, moisture sensors, magnetic sensors, audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), and/or other sensors.

User input and other information may be gathered using sensors and other input devices in input-output devices 22. If desired, input-output devices 22 may include other devices 24 such as haptic output devices (e.g., vibrating components), light-emitting diodes and other light sources, speakers such as ear speakers for producing audio output, circuits for receiving wireless power, circuits for transmitting power wirelessly to other devices, batteries and other energy storage devices (e.g., capacitors), joysticks, buttons, and/or other components.

Electronic device 10 may have housing structures (e.g., housing walls, straps, etc.), as shown by illustrative head-mounted support structure 26. Structure 26 (see, e.g., structure 26 of FIG. 1) may be formed from polymer, glass, metal, carbon-fiber materials and/or other fiber-composite materials, ceramic, wood, leather, and/or other natural materials, fabric, other materials, and/or combinations of two or more of these materials.

Figure 3:
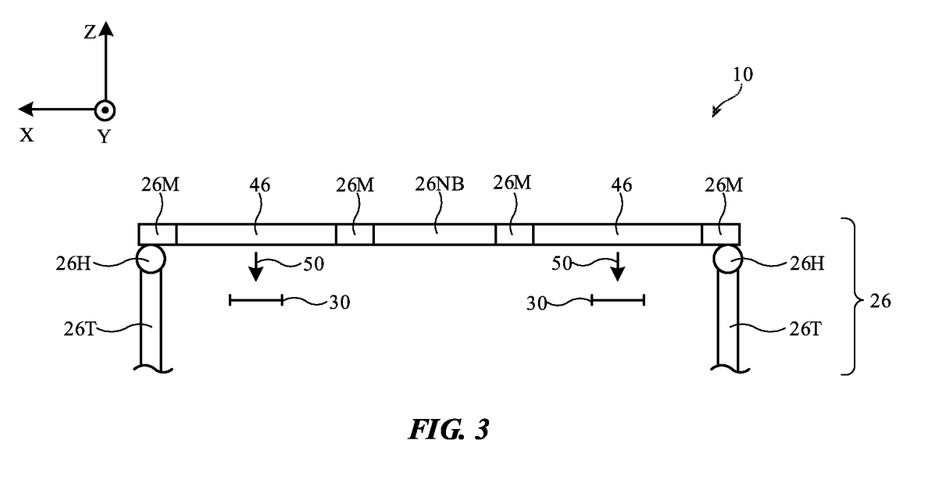
FIG. 3 is a top view of an illustrative electronic device in accordance with an embodiment.

FIG. 3 is a top view of and illustrative head-mounted device. As shown in the illustrative configuration of FIG. 3, support structure 26 of head-mounted device 10 may include a frame portion (e.g., portion 26M) that holds lenses 46 in front of eye boxes 30. In this location, the left and right display systems of device 10 provide respective left and right images 50 to eye boxes 30 in the −Z direction. Hinges 26H may be used to couple portion 26M of structure 26 to portions 26T (e.g., temples or other elongated support members that extend along the left and right sides of a user's head when device 10 is being worn may be coupled to the left and right edges of portion 26M with hinges 26H). Nose bridge portion 26NB may be used to couple the left half of the frame of device 10 (which holds the left lens 46) to the right half of the frame of device 10 (which holds the right lens 46).

Figure 4:
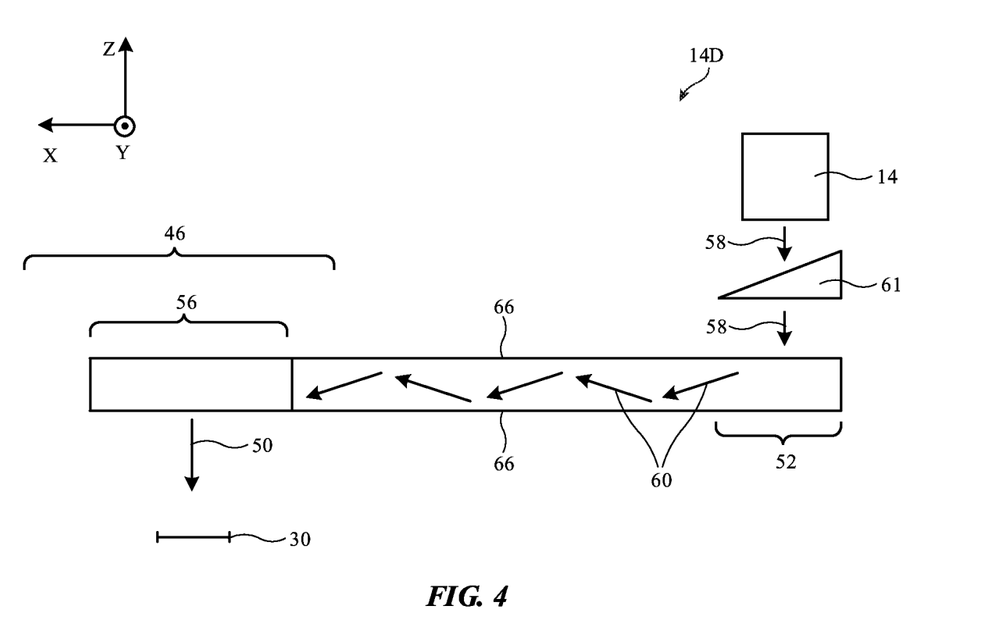
FIG. 4 is a cross-sectional view of an illustrative display system in accordance with an embodiment.

FIG. 4 shows an illustrative display system of the type that may be used to provide an image for viewing by a user (see, e.g., image 50 of FIG. 4). As shown in FIG. 4, display system 14D includes a display device such as display 14. Display 14 may be, for example, a scanning mirror device or other display projector that produces light for an image (see, e.g., image 58). Waveguide 54 may be used to laterally convey the image to a location in front of eye box 30. Waveguide 54 (e.g., a clear layer of polymer, glass, and/or other transparent material) may have a first end adjacent to display 14 and a second end adjacent to eye box 30. Input coupler 61 (e.g., a prism, grating, hologram, and/or other light refracting and/or light diffracting structures, etc.) may be used to couple image 58 into waveguide 54. Image 58 may then be conveyed along the length of waveguide 54. As shown in FIG. 4, guided image light (light 60) for image 58 may be guided within waveguide 54 between waveguide surfaces 66 in accordance with the principal of total internal reflection. Display system 14D may have an output coupler such as output coupler 56 (e.g., a grating, hologram, and/or other output coupler formed in and/or on waveguide 54). Output coupler 56 may be formed in the center of lens 46 in alignment with eye box 30. When internally guided image light 60 reaches output coupler 56, output coupler 56 may direct the image from display 14 to eye box 30 as output image 50 (e.g., in the −Z direction in the orientation of FIG. 4).

To prevent excessive bending and misalignment of portions of structure 26 with respect to each other, it may be desirable to form structure 26 from relatively stiff structures (e.g., rigid polymer, metal, etc.). At the same time, care should be taken that structure 26 does not become overly bulky and heavy to ensure user comfort during use. Particularly when limiting the bulk and weight of structure 26 due to these practical considerations, it may not be feasible to prevent absolutely all movement of portions of structure 26 with respect to each other. For example, structure 26 may be configured so that the forces that are imposed on structure 26 during normal use tend to bend portion 26M about nose bridge portion 26NB. These forces may include outward pressure from the sides of the user's head onto portions 26T, stress from unexpected drop events, and/or other stresses. When portion 26M bends about nose bridge portion 26NM in this way, each waveguide 54 may change its angular orientation slightly (e.g., so that the left and right waveguides in device 10 change their angular orientation with respect to each other).

Figure 5:
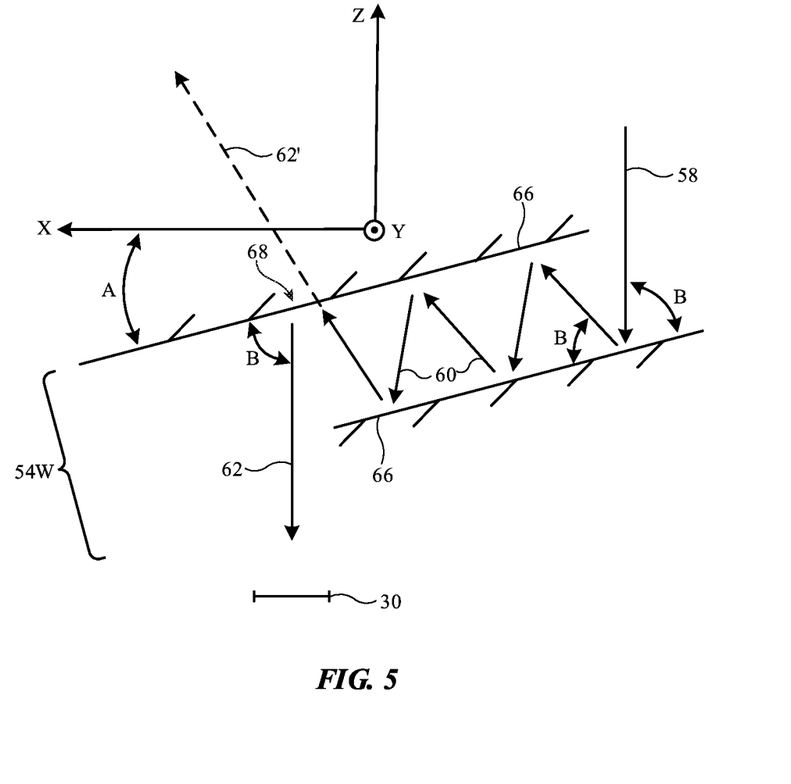
FIG. 5 is a diagram of an illustrative display system with reflective light guiding structures that are tilted in accordance with an embodiment.

Consider, as an example, the scenario illustrated in FIG. 5. FIG. 5 is a schematic top view of an illustrative waveguide (waveguide 54W) formed from parallel reflective interfaces at opposing parallel upper and lower waveguide surfaces 66 (e.g., mirrors in this illustrative example). In this example, waveguide 54W is normally horizontal so that surfaces 66 are parallel to the X-Y plane of FIG. 5. Due to stress from wearing device 10 on the head of a user and/or other external forces, structure 26 bends about nose bridge portion 26NB and allows waveguide 54W to move out of alignment with the X-Y plane by a positive or negative angle A. The value of angle A may be, for example, less than a few degrees in magnitude).

With the arrangement of FIG. 5, image 58 is supplied to waveguide 54W in the same direction that waveguide 54W supplies output image 62 to eye box 30 (the −Z direction). Due to the parallelism of surfaces 66 with respect to each other and due to the fact that image light 60 experiences an even number of reflections (each at angle B=90-A with respect to a corresponding surface 66) along the length of waveguide 54, incoming image light (image 58) will be output as output image 62 along the −Z axis, in the same direction of travel as input light (image 58), regardless of the value of angle A. This may help ensure that image 62 is supplied to eye box 30 with satisfactory alignment, even as structure 26 and the waveguides in structure 26 bend slightly about nose bridge portion 26NB.

As shown in the diagram of FIG. 5, image 58 is initially traveling in the −Z direction. Upon entering waveguide 54W, internally reflected light rays 60 make an angle B with respect to reflective surfaces 66. As the value of angle A is varied, the value of B also varies. Nevertheless, because the angle of incoming image 58 with respect to surfaces 66 (angle B) is the same as the angle of outgoing image 62 with respect to surfaces 66 (angle B) in this example, image 62 will propagate toward eye box 30 in an unaltered direction (aligned with the −Z axis), regardless of the amount of misalignment (tilt) exhibited by waveguide 54W. For example, image 62 will travel along the −Z axis whether A is 3° or 5°. If light 60 only were to experience an odd number of reflections, the output image from waveguide 54W would travel along direction 62', which changes as a function of changing angle A.

Figure 6:
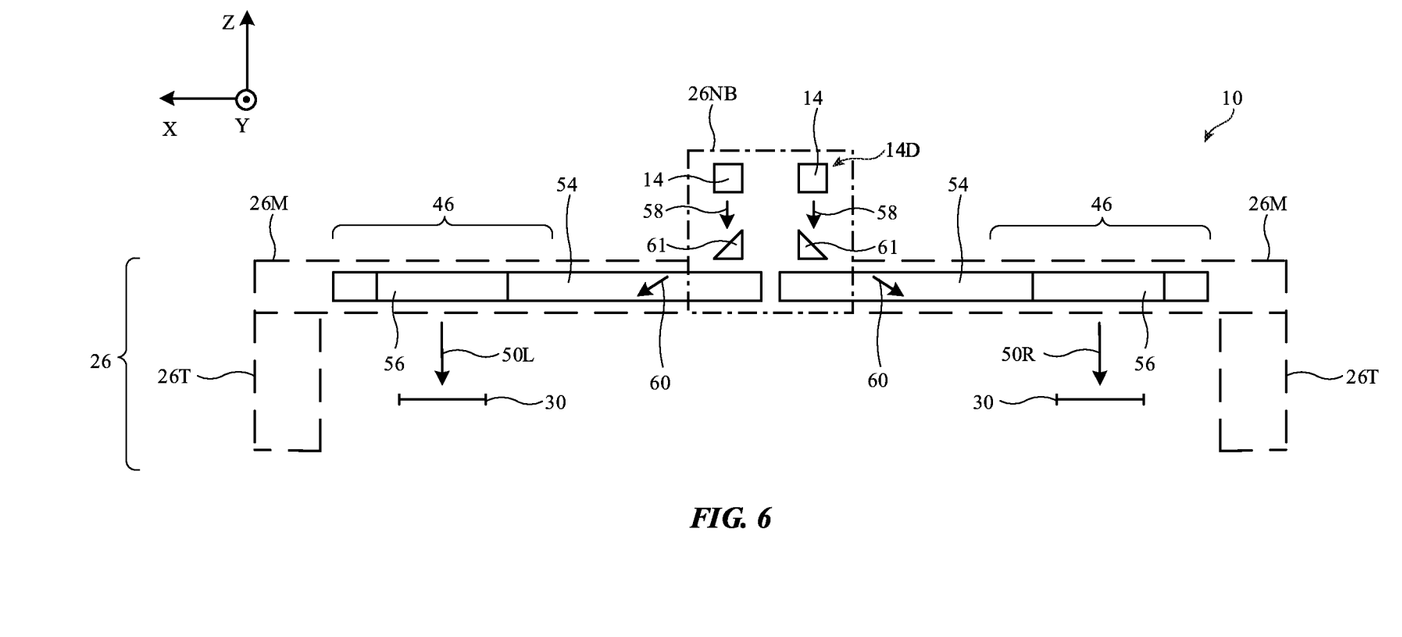
FIG. 6 is a top view of an illustrative electronic device in accordance with an embodiment.

These optical properties can be used to help maintain image alignment between the left and right images provided to eye boxes 30 during use of device 10. Consider, as an example, illustrative device 10 of FIG. 6. As shown in FIG. 6, left and right displays 14 of respective left and right display systems 14D can be located in the center of device 10 (e.g., in nose bridge portion 26NB) facing inwardly. In this position, displays 14 can be rigidly attached to each other and/or otherwise maintained in alignment with each other during operation of device 10. This helps ensure that the left and right images 58 at the outputs of displays 14 remain aligned even if structure 26 is stressed.

Displays 14 provide images 58 in the inward (−Z direction), which are routed to eye boxes 30 through waveguides 54. Input couplers 61 may be used to couple images 58 into waveguides 54 so that left and right images are conveyed outwardly in respective left and right directions as guided light 60. Output couplers 56 may be formed in the center of lenses 46, so that lenses 46 overlap couplers 56. Lenses 46 may be clear so that a user with eyes located in eye boxes 30 may view real-world objects through lenses 46, output couplers 56, and waveguides 54. At the same time, output couplers 56, which overlap eye boxes 30, may be used to extract light 60 and thereby provide respective left and right eye boxes 30 with corresponding left image 50L and right image 50R. Light 60 in this type of configuration experiences an even number of reflections. As a result, bending of portion 26M and waveguides 54 about nose bridge portion 26NB does not tend to misalign images 50L and 50R with respect to each other or eye boxes 30, as described in connection with the example of FIG. 5. Even if, as an example, portion 26M bends backwards in the X-Z plane on the left and right sides of nose bridge portion 26NB so that the left and right waveguides and other components are oriented at an increased angle A with respect to the Z axis, left image 50L will remain oriented parallel to the −Z direction (in this example) and right image 50R will remain orientated parallel to the −Z direction (in this example). This configuration therefore allows portion 26M to be constructed in a way that allows slight bending to occur about nose bridge portion 26NB when structure 26 is stressed, rather than making device 10 overly bulky and heavy in an effort to prevent all possible movement of the left and right waveguides with respect to each other.

If desired, the left and right sides of portion 26M may be raked backward slightly (e.g., by a few degrees) to allow the left and right sides of portion to extend parallel to the left and right sides of the user's face or to otherwise enhance ergonomics and/or to enhance the appearance of device 10. Whether the left and right sides of portion 26M are parallel to the X axis as shown in FIG. 6 or are raked backwards towards the user's face in this way, the placement of displays 14 in nose bridge portion 26NB in a rearwardly facing configuration helps allow portion 26M to accommodate some bending at nose bridge portion 26NB without risking misalignment of the left and right images 50L and 50R with the left and right eye boxes 30 or each other.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people.

People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A head-mounted device, comprising:
a head-mounted support structure having a frame with a nose bridge portion and having left and right elongated side portions that extend from respective left and right portions of the frame, wherein the frame has a front that faces outwardly away from left and right eye boxes and has an opposing rea r that faces inwardly towards the left and right eye boxes and wherein the left and right portions of the frame are raked inwardly towards the left and right eye boxes by a first angle;
left and right transparent lenses supported respectively on the left and right portions of the frame;
a left display system configured to provide a left image in a first direction inwardly towards the left eye box and a right display system configured to provide a right image in a second direction inwardly towards the right eye box, wherein the left display system has a left inwardly facing display device in the nose bridge portion, wherein the right display system has a right inwardly facing display device in the nose bridge portion, and wherein the first and second directions in which the left and right images are respectively provided towards the left and right eye boxes are parallel in a configuration in which the raked left and right portions of the frame are bent about the nose bridge portion by a second angle different than the first angle; and
a microphone configured to gather user audio input.

2. The head-mounted device defined in claim 1 wherein the left display system has a left waveguide supported by the left portion of the frame, a left input coupler between the left inwardly facing display device and the left waveguide that couples light from the left inwardly facing display device into the left waveguide, and a left output coupler that couples the left image out of the left waveguide and wherein the right display system has a right waveguide supported by the right portion of the frame, a right input coupler between the right inwardly facing display device and the right waveguide that couples light from the right inwardly facing display device into the right waveguide, and a right output coupler that couples the right image out of the right waveguide.

3. The head-mounted device defined in claim 2 wherein the left output coupler overlaps the left eye box and is overlapped by the left transparent lens and wherein the right output coupler overlaps the right eye box and is overlapped by the right transparent lens.

4. The head-mounted device defined in claim 1 wherein the left and right elongated side portions comprise respective left and right temples, the head-mounted device further comprising a left hinge that couples the left temple to the frame and a right hinge that couples the right temple to the frame.

5. The head-mounted device defined in claim 1 wherein the left inwardly facing display device and the inwardly facing right display device comprise image projectors that project images to the left and right input couplers, respectively.

6. The head-mounted device defined in claim 1 further comprising a speaker that produces audio output.

7. The head-mounted device defined in claim 1 further comprising:
an energy storage device; and
a wireless power circuit.

8. Glasses, comprising:
left and right lenses through which real-world objects are viewable from respective left and right eye boxes;
a frame having a left portion configured to receive the left lens and a right portion configured to receive the right lens and having a nose bridge portion that couples the left and right portions;
a left temple that is coupled to the left portion of the frame;
a right temple that is coupled to the right portion of the frame;
left and right displays in the nose bridge portion that are configured to produce left and right images for the left and right eye boxes, respectively;
a left waveguide that overlaps the left lens; and
a right waveguide that overlaps the right lens, wherein the right display is configured to provide right image light to a first reflective surface of the right waveguide at an incoming angle with respect to the first reflective surface, wherein a right output coupler on the right waveguide is configured to provide the right image light towards the right eye box at an outgoing angle with respect to a second reflective surface of the right waveguide, wherein the right portion is configured to bend a bout the nose bridge portion to allow the right waveguide to move out of an original right waveguide alignment plane by bending by an additional angle, and wherein the outgoing angle is configured to be equal to the incoming angle as the additional angle is varied between first and second values.

9. The glasses defined in claim 8 wherein the left waveguide is configured to guide the left image and wherein the right waveguide is configured to guide the right image.

10. The glasses defined in claim 9 further comprising a left output coupler configured to provide the left image from the left waveguide to the left eye box, wherein the and a right output coupler is configured to provide the right image from the right waveguide to the right eye box.

11. The glasses defined in claim 10 wherein the frame has a front that faces outwardly away from the left and right eye boxes and an opposing rear that faces inwardly towards the left and right eye boxes and wherein the left and right displays are configured to emit light inwardly.

12. The glasses defined in claim 11 wherein the left and right displays are configured to remain aligned with respect to each other during bending of the left and right portions of the frame about the nose bridge portion.

13. A head-mounted device configured to provide a left image to a left eye box and a right image to a right eye box, comprising:
- a head-mounted support structure having left and right portions joined by a nose bridge portion;
- a left waveguide in the left portion and a right waveguide in the right portion;
- a left inwardly facing display in the nose bridge portion and configured to supply left image light that reaches the left waveguide at an incoming angle with respect to a first reflective surface of the left waveguide and that is output from the left waveguide at an outgoing angle with respect to a second reflective surface of the left waveguide, wherein the left portion is configured to bend about the nose bridge portion to allow the left waveguide to move out of an original left waveguide alignment plane by bending by a waveguide misalignment angle and wherein the incoming angle and the outgoing angle remain equal to each other as the waveguide misalignment angle is varied;
- a right inwardly facing display in the nose bridge portion; and
- an ambient light sensor.

14. The head-mounted device defined in claim 13 further comprising a first transparent member in the left portion through which real-world objects are viewable from the left eye box and a second transparent member in the right portion through which the real-world objects are viewable from the right eye box.

15. The head-mounted device defined in claim 14 wherein the left waveguide has first and second opposing ends, wherein the first end of the left waveguide is in the nose bridge portion, wherein the right waveguide has first and second opposing ends, and wherein the first end of the right waveguide is in the nose bridge portion.

16. The head-mounted device defined in claim 15 further comprising a left input coupler between the left inwardly facing display and the first end of the left waveguide and a right input coupler between the right inwardly facing display and the first end of the right waveguide.

17. The head-mounted device defined in claim 16 wherein the second end of the left waveguide overlaps the first transparent member and wherein the second end of the right waveguide overlaps the second transparent member.

18. The head-mounted device defined in claim 17 further comprising a left output coupler at the second end of the left waveguide and a right output coupler at the second end of the right waveguide.

19. The head-mounted device defined in claim 18 wherein the left output coupler is configured to provide the left image to the left eye box from the second end of the left waveguide and wherein the right output coupler is configured to provide the right image to the right eye box from the second end of the right waveguide.

20. The head-mounted device defined in claim 19 wherein the left inwardly facing display, the left input coupler, the left waveguide, and the left output coupler form a left display system configured to present the left image to the left eye box, wherein the right inwardly facing display, the right input coupler, the right waveguide, and the right output coupler form a right display system configured to present the right image to the right eye box, and wherein the left and right display systems are configured to maintain alignment of the left and right images with respect to each other at the left and right eye boxes as the left and right portions bend about the nose bridge portion and the left and right waveguides change angular orientation with respect to each other.

* * * * *

UNITED STATES PATENT AND TRADEMARK OFFICE
CERTIFICATE OF CORRECTION

PATENT NO. : 12,050,324 B1
APPLICATION NO. : 17/307891
DATED : July 30, 2024
INVENTOR(S) : David A. Kalinowski It is certified that error appears in the above-identified patent and that said Letters Patent is hereby corrected as shown below:

In the Claims

Column 11, Line 35, "rea r" should read -- rear --

Column 12, Line 62, "the and a" should read -- the --

Signed and Sealed this
Twenty-ninth Day of October, 2024

Katherine Kelly Vidal
Director of the United States Patent and Trademark Office